Figure 4:
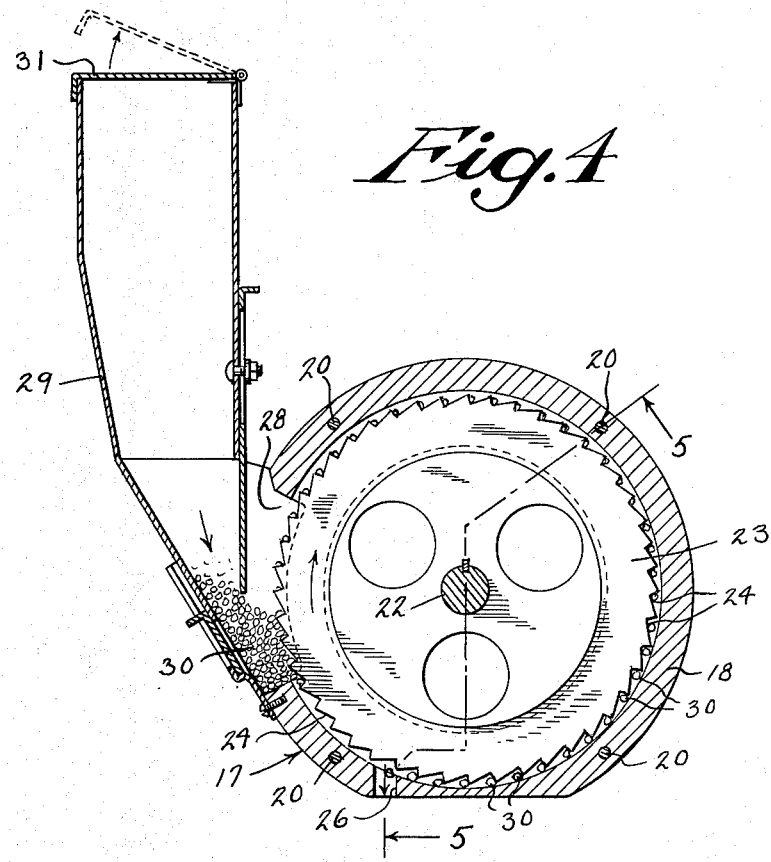

Nov. 23, 1965
E. C. LEACH ETAL
3,219,000
SEED PLANTER
Filed Nov. 14, 1963
3 Sheets-Sheet 1
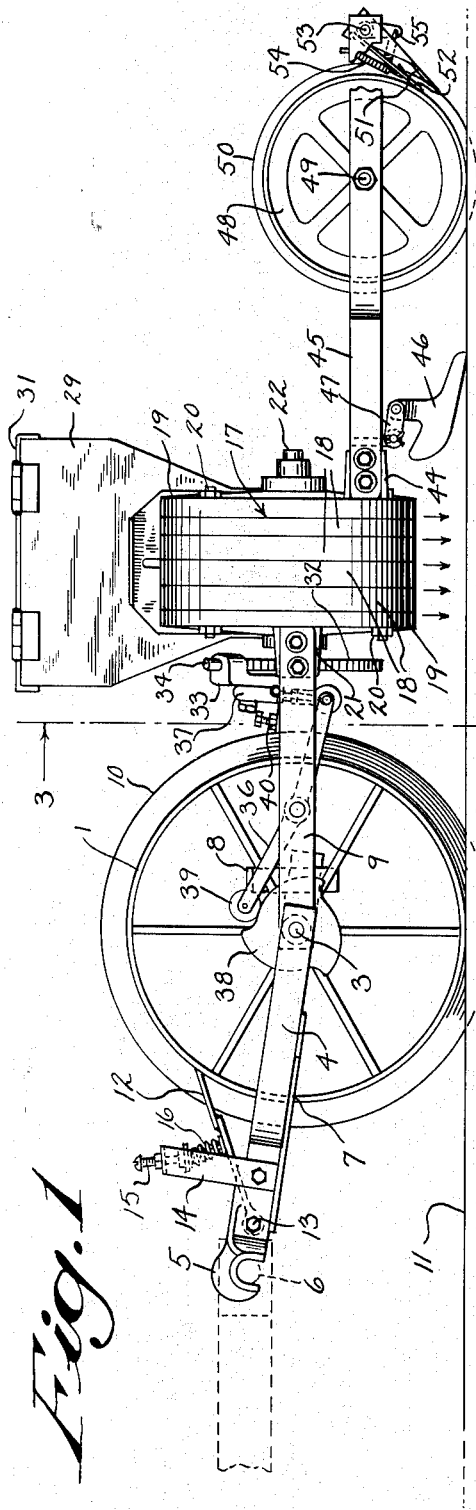
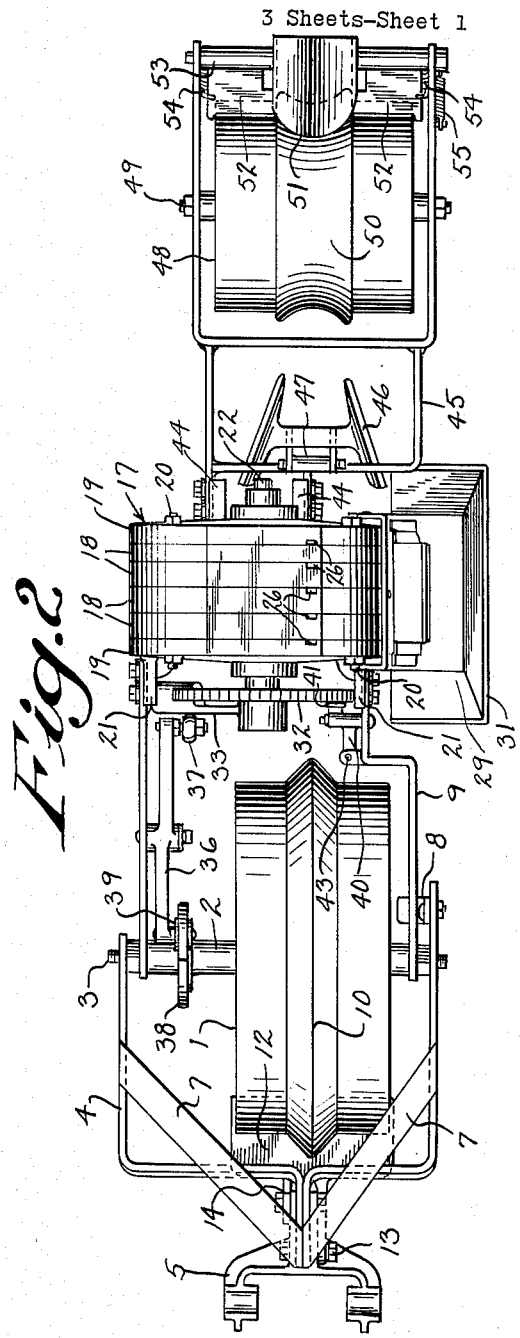
INVENTORS
ELBERT C. LEACH
ELBERT C. LEACH, JR.
BY
*Allan W. Leiser*
ATTORNEY

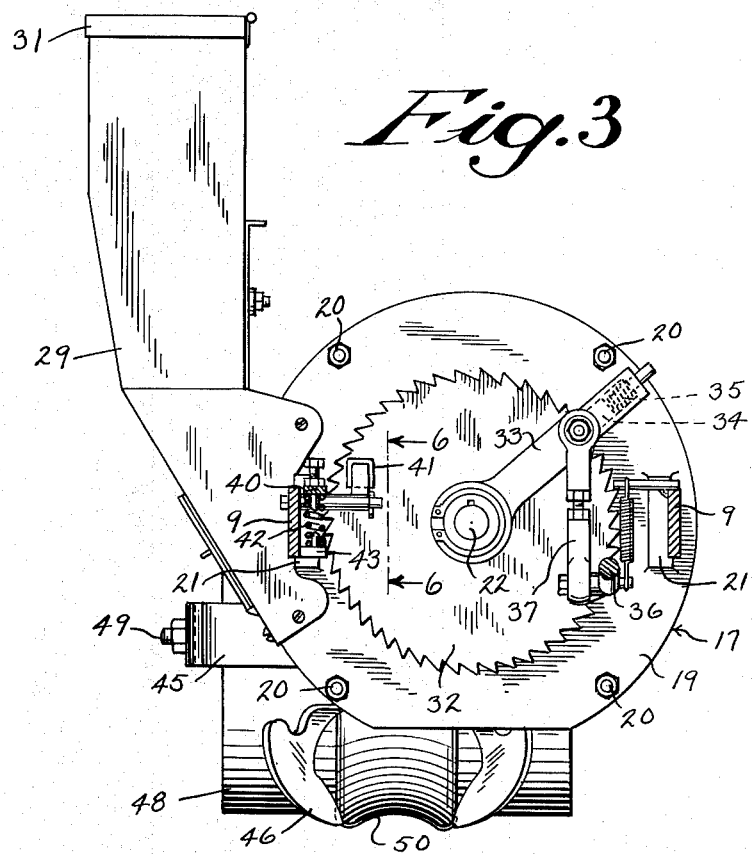
Fig.3
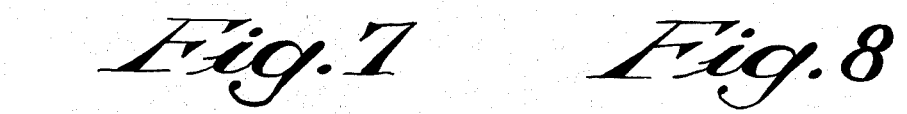
Fig.7  Fig.8
INVENTORS
ELBERT C. LEACH
ELBERT C. LEACH, JR
BY 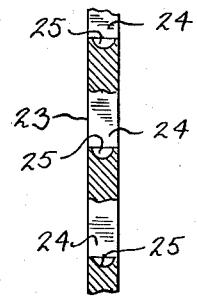
ATTORNEY Nov. 23, 1965  E. C. LEACH ETAL  3,219,000
SEED PLANTER Filed Nov. 14, 1963  3 Sheets-Sheet 3

INVENTORS
ELBERT C. LEACH
ELBERT C. LEACH, JR

BY Allan W. Leiser

ATTORNEY

United States Patent Office

3,219,000
Patented Nov. 23, 1965

3,219,000
SEED PLANTER
Elbert C. Leach, Rte. 4, Oshkosh, Wis., and Elbert C.
Leach, Jr., Rte. 1, Berlin, Wis.
Filed Nov. 14, 1963, Ser. No. 323,648
4 Claims. (Cl. 111—77)

This invention relates to mechanical seed planters of the type in which notched disc means is used to pick up seeds from a seed supply and deposit them in a prepared furrow; and it resides more particularly in an improved planter of this type especially adapted for rapid, extremely accurate placement of seeds.

Seed planters of the type contemplated by this invention are particularly useful on mechanized, high production farms and are especially advantageous for planting crops such as celery. High speed is of course one of the primary reasons for using a mechanical seeder instead of hand planting.

Accuracy of seed placement is, however, of equal or even greater importance than speed. In planting a crop such as celery, for example, it is necessary to space the individual seeds as closely as possible in order to make maximum use of the available land. The seeds cannot, however, be too closely spaced lest the plants crowd one another thereby preventing maximum growth and reducing salability. If the seeds are planted too closely, it may be necessary to hand-thin the resulting plants which is a time-consuming and costly operation. If two seeds are mistakenly planted in intimate association, a Siamese-twin plant may result which is of no commercial value and must ultimately be destroyed. Uniform seed placement is also valuable in that the resulting plants are regularly spaced to simplify cultivating, harvesting and other farming operations.

A number of planters of the type contemplated herein have been devised. None, however, is entirely satisfactory primarily because previously devised planters, although they may initially dispense seeds in a fairly accurate manner, are so constructed as to allow the seeds to roll, twist or otherwise move as they are deposited in a furrow.

Such seed movement is a result of a number of structural deficiencies in previously devised planters. For example, some such planters have a seeder disc that rotates in a plane parallel to the line of movement of the planter. In such cases, seeds coming off the disc may have a longitudinal force component which tends to make them roll in the direction of movement of the planter. In other older designs, the seeder disc and discharge port therefor are constructed in such a manner so that they often deposit more than one seed at a time. Further, many older planters include plow-type means to open a furrow in advance of the seeder disc. The bottom of the furrow is necessarily uneven as a result of the plowing operation and contains lumps of dirt and seeds hitting these lumps may bounce in any direction.

The problems of seeds rolling or bouncing is particularly acute when pelleted seeds are planted. Pelleted seeds are seeds, for example such as celery seeds, which are provided with a coating of inert material to form a hard, relatively round and smooth pellet which is extremely liable to roll or bounce.

It is an object of this invention to provide a planter in which a seeder disc rotates in a vertical plane perpendicular to the line of movement of a seed planter to avoid imparting a longitudinal force component to seeds discharged from the disc.

It is another object of this invention to provide a planter utilizing a plurality of discs disposed at right angles to its line of movement which discharge simultaneously to reduce the number of times the disc rotating mechanism must be actuated in traversing a given length of field.

It is a further object of this invention to provide a seed planter in which the seeder discs are arranged to discharge seeds without imparting a spinning or twisting motion to the seeds.

It is still another object of this invention to provide a planter in which a stepping mechanism is used to rotate the seeder discs in discrete steps of movement to insure that all seeds carried in the notches of the wheels are discharged properly.

It is a still further object of this invention to provide a planter in which seeder discs are provided with a number of notches about their circumferences, the discs and discharge ports leading therefrom being arranged to insure the pickup and deposit of one and only one seed for each notch.

It is still another object of this invention to provide a planter in which a number of seeder discs are fed from a single seed supply source.

It is a still further object of this invention to provide a planter which incorporates a furrowing means which moves in advance of the seed wheels and which includes a V-shaped ridge which forms a smooth, V-shaped groove or furrow in which the seeds are deposited.

It is still another object of this invention to provide a planter in which there is a furrow closing mechanism following the seed wheels which closes the furrow after the seeds have been deposited therein in such a manner as to eliminate or reduce to a minimum movement of the seeds in the furrow.

Other objects and advantages will appear from the description to follow. In the description, reference is made to the accompanying drawings, forming a part hereof, in which there is shown by way of illustration and not of limitation a preferred embodiment of the invention.

Figure 5:
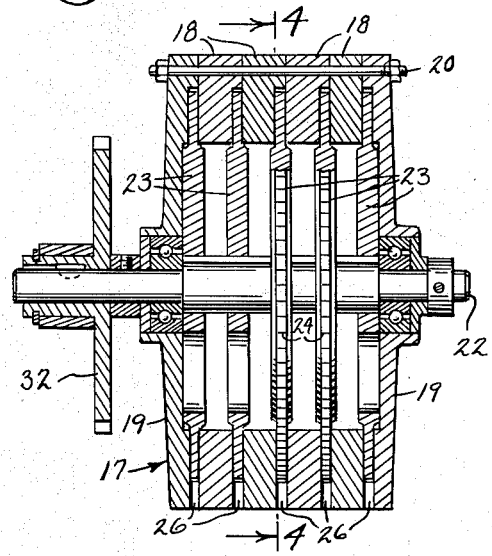
Figure 6:
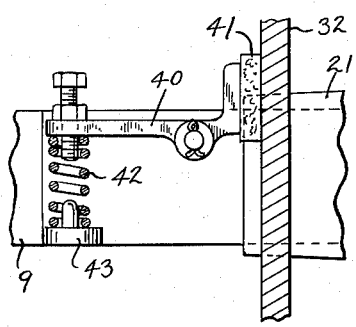

In the drawings:

FIG. 1 is a side view in elevation with parts broken away of a seed planter formed according to this invention, FIG. 2 is a bottom view of the planter of FIG. 1, FIG. 3 is a view in cross section of the planter of FIG. 1, which view is taken in the plane 3—3 shown in FIG. 1 to disclose a seed dispenser portion of the apparatus, FIG. 4 is a view in cross-section of the seed dispenser portion shown in FIG. 3 that is taken in the plane 4—4 shown in FIG. 5, FIG. 5 is a view in cross-section of the seed dispenser portion shown in FIGS. 3 and 4 taken in the plane 5—5 shown in FIG. 4, FIG. 6 is a fragmentary view showing a brake mechanism for the seed dispenser and taken in the plane 6—6 shown in FIG. 3, FIG. 7 is an enlarged fragmentary view, with parts shown in cross-section, of a portion of the seed dispenser, there also being shown an optional plug for a seed discharge port not shown in other views, and FIG. 8 is a fragmentary view in cross-section taken in the plane 8—8 shown in FIG. 7.

The embodiment of the invention shown herein is designed to be pulled by a tractor or other vehicle and comprises three major elements or portions, seen clearly in FIGS. 1 and 2. These are, in serial order: furrowing means; a seed dispenser; and furrow closing means.

The furrowing means comprises a relatively large, spoked wheel 1 having an integral quill shaft extension 2 extending transversely through its axis. The shaft 2 and wheel 1 turn freely about a bearing shaft 3. A pair of pulling arms 4 have their rear ends rotatably mounted on outwardly extending ends of the shaft 3 and extend forwardly (to the left as seen in FIGS. 1 and 2) to be joined together in front of the wheel 1 at their forward ends.

A bifurcated hitch member 5 is bolted to the joined forward ends of the arms 4 and has forwardly extending hooked fingers which are engageable over the draw bar 6 of a tractor or other pulling vehicle. Brace members 7 are welded to the undersides of and extend between the forward and rear ends of the arms 4.

By virtue of the rotatable connection between arms 4 and the shaft 3, the hitch 5 is free to move up and down in an arcuate manner so that very little if any bouncing of the pulling vehicle is transmitted to the planter. Upward movement (clockwise rotation as seen in FIG. 1) of the arms 4 is limited by means of an L-shaped stop 8 bolted to an overhanging end of the lowermost arm 4 as seen in FIG. 2 and having an overhanging leg that is engageable with one of a pair of frame members 9 that have their forward ends mounted on the ends of the shaft 3 inwardly of the arms 4. The members 9 extend rearwardly to connect the wheel 1 with a seed dispenser that will be described hereinafter.

As can be seen most clearly in FIG. 2, the cylindrical outer surface of the wheel 1 is relatively wide and is provided around its center with a radially extending ridge 10 that is of substantially V-shaped cross-section. The wheel 1 can be relatively heavy, and as it is pulled along the soil, indicated by the reference numeral 11, the ridge 10 is forced by the weight of the planter into the soil 11 to form a V-shaped furrow.

Because the furrow is formed by a pressing or molding action rather than by a plowing action as in older planters, it is extremely smooth and substantially free from lumps of dirt which might cause seeds deposited in the furrow to bounce or roll. The effectiveness of the ridge 10 is further enhanced by the wide smooth surfaces of the wheel 1 on either side since this helps to balance and guide the wheel 1 to prevent wandering. The engagement of these surfaces also serves to establish the depth of the furrow, and the smooth surfaces of the wheel 1 form smooth strips on either side of the furrow to reduce the chance of stray lumps of dirt falling therein. The furrow formed by the ridge 10 is thus both smooth and uniform which is of great value in the accurate placement of seeds.

To ensure that the ridge 10 and surfaces of the wheel 1 remain clean, a scraper 12 is provided that is pivotally mounted at 13 and is notched to conform to the ridge 10. An upstanding L-shaped support 14 is bolted to the hitch 5, and an adjustment screw 15 is threadedly engaged with its overhanging leg. A compression spring 16 operates between a seat member at the end of the screw 15 and the scraper 12 to urge the scraper 12 against the wheel 1. The force exerted by the spring 16 may of course be varied by means of adjusting the screw 15.

Behind the wheel 1, to the right as seen in FIGS. 1 and 2, is a seed dispenser including a housing 17 comprising, as can be seen most clearly in FIGS. 4 and 5, four circular rings 18 and two end plates 19 assembled and held together by elongated bolts 20 to form a hollow cylindrical housing with its axis parallel to the line of movement of the planter. A pair of forwardly extending lugs 21 are bolted to the left hand end plate 19 as seen in FIGS. 1 and 2, and the rear ends of the frame members 9 are bolted to the lugs 21 thus connecting the housing 17 with the wheel 1.

Again referring to FIGS. 4 and 5, it can be seen that a shaft 22 extends through the axis of the housing 17. Keyed to the shaft 22 to rotate therewith in a plane transverse to the line of movement of the planter are five spaced seeder discs 23 having peripheral marginal portions of reduced thickness and provided about their entire peripheries with seed carrying notches 24. Each notch 24 comprises a generally radial floor and an overhanging portion leading from the rear of the floor to the periphery of the disc 23. As can be seen in FIGS. 7 and 8, the floor of each notch is provided with a small depression or pocket 25.

Referring to FIG. 5, it can be seen that the end plates 19 and three of the rings 18 are recessed to provide relatively close fitting channels for the thinner marginal portions of the discs 23. The end plates 19 and the same three rings 18 are also provided at their bottoms with downwardly opening discharge ports 26, each port 26 being located immediately under a corresponding disc 23 which passes thereover. As seen in FIG. 4, the discs 23 rotate in a clockwise direction and the corresponding ports 26 are located to the left or beyond the vertical center line of the discs 23.

If desired, one or more of the ports 26 may be closed off by means of a plug 27, which is optional and is shown only in FIG. 7, attached to the underside of the housing 17. Alternatively, a channel (not shown) curved to conform to the discs 23 can be mounted on the housing 17 with its sides extending inwardly over the exposed periphery of one or more discs 23 at the opening 28 to cover the notches 24 and prevent the pickup of seeds 30. By either of these means, one or more discs 23 can be effectively rendered inoperative if desired.

The left hand side of the housing 17 as seen in FIGS. 3 and 4 is open to provide a seed supply opening 28 which is located above and on the same side of the vertical center line of the discs 23 as the ports 26. A sheet metal hopper 29 is bolted to the housing 17 so that seeds 30 therein (shown herein as being pelleted celery seeds) are fed into and through the supply opening 28 of the housing 17. The hopper 29 is provided with a hinged cover 31 for filling and emptying the same.

The shaft 22, and the discs 23, are rotated by means of a stepping mechanism in the form here of a ratchet mechanism located forwardly of the housing 17. This ratchet or stepping mechanism includes a ratchet wheel 32 keyed to the shaft 22 and rotatable in a vertical plane parallel to the planes of rotation of the discs 23. A pawl arm 33, seen most clearly in FIG. 3, is rotatably mounted at the end of the shaft 22 forwardly of the wheel 32. Received in the hollow outer end of the pawl arm 33 is a pawl member 34 engageable with the teeth of the ratchet wheel 32, a compression spring 35 being used to urge the pawl member 34 toward such engagement.

An actuating lever 36, seen most clearly in FIGS 1 and 2, is pivotally mounted near its center on one of the frame members 9 and has its rear end connected with the pawl arm 33 by means of an adjustable link 37. A cam plate 38 is mounted on a flange on the quill shaft 2 to be rotatable therewith and is in camming engagement with a cam roller 39 at the forward end of the lever 36. It will be readily appreciated that as the cam plate 38 rotates with the wheel 1 when the planter is pulled by a tractor or other vehicle, the linkage afforded by the lever 36, link 37 and pawl arm 35 will cause the ratchet wheel 32 to be rotated in incremental steps, in this particular embodiment three notches for each complete revolution of the wheel 1.

A brake mechanism is provided for the wheel 32 which includes a lever 40, seen most clearly in FIG. 6, pivotally mounted intermediate its ends on the lowermost frame member 9 as seen in FIG. 2. The rear end of the lever 40 has attached thereto a brake pad 41 engageable with the forward surface of the ratchet wheel 32. A spring 42 operating between lugs 43 on the frame member 9 and the forward end of the lever 40 serves to urge the lever 40 in a clockwise direction to urge the pad 41 against the wheel 32. The braking effect of the pad 41 prevents backlash and dampens somewhat the necessarily jerky movements of the ratchet wheel 32.

The operation of the seed dispenser may be understood with particular reference to FIGS. 4 and 7. As previously stated, the wheels 23 rotate with the ratchet wheel 32 in a clockwise direction as seen in FIG. 4. As can be seen in FIG. 4, each of the wheels 23 passes by the supply opening 28 and through the supply of seeds 30 there located. As this occurs, one seed 30 is picked up in each notch 24 and carried about the major portion of the circumference of the disc 23 to the discharge port 26 through which it falls to be deposited in the furrow formed by the land 10. The channels in the housing 17 prevent the seeds 30 from falling from the notches 24 during their journey.

The location of the opening 28, the location of the ports 26 and the configuration of the notches 24 all play a part in the effective pickup and deposit of the seeds 30. The opening 28 should, for example, be located high enough so that the floors of the notches 24 are almost horizontal to have an effective shoveling action. That is, if the floors are at too much of a downward angle, seeds 30 thereon will roll off rather than being picked up to be carried about the disc 23. The pockets 25 are also of importance in insuring effective pickup of one and only one seed 30. Further, the notches 24 should be of a size large enough to insure that larger seeds will fit therein, but not so large as to accommodate two seeds. Here again, the pockets 25 are valuable since they are large enough to accommodate only one seed 30 and the presence of one seed 30 in a pocket 25 tends to prevent the entry of others.

The location of the ports 26 is also of great importance, primarily because all seeds vary considerably in size. A seed 30 is intended to be discharged from the floor of each notch 24 as it passes over a port 26. Small seeds 30 may, however, during their downward movement with the disc 23 fall from the floors of the notches 24 to the top or outermost portion of the notch 24. If a notch 24 passes over a port 26 with a seed 30 on its floor and the seed 30 in the succeeding notch 24 is at the top of its notch 24 rather than the floor, both seeds 30 may fall through the port 26 at the same time, since there must for mechanical reasons be substantial clearance between the discs 23 and housing 17. Viewing FIG. 4, for example, where one seed 30 is shown as being discharged, it can be seen that a small seed 30 in the succeeding notch 24 could fall through the port 26.

To insure against dropping two seeds 30 at once, it is important that the ports 26 be beyond, or to the left as seen in FIG. 4, the vertical center lines of the discs 23. Beyond the center lines, the notches 24 have begun upward movement and gravity will force the seeds 30 to the floors of the notches 24.

When the seeds 30 have been carried about the discs 23 to positions where they are above the ports 26, the floors of the notches 24 are substantially vertical. The seeds are thus allowed to drop out of the notches 24 without any rolling or twisting due to rolling off a nonvertical surface, and fall straight into the furrow prepared by the ridge 10.

The ratchet mechanism used to turn the discs 23 also aids in insuring effective discharge. The wheel 32 and discs 23 have equal numbers of teeth and are arranged so that each discrete step on increment of movement of the wheel 32 causes a notch 24 on each disc 23 to be moved from just out of position over a port 26 to a discharge position immediately over the port 26. To illustrate, the notch 24 shown as discharging in FIG. 4 is just completing a movement as the result of an incremental movement of the wheel 32. This stop-and-start movement which moves the notches 24 into discharge position jars the seeds 30 therein to insure that they are discharged.

Each time the ratchet wheel 32 moves one notch, each of the discs 23 is moved one notch which results in the simultaneous depositing of five seeds, one for each disc. The wheel 1 then moves one-third of a revolution before the next actuation so that the entire housing 17 is moved to a new position to the left as seen in FIG. 1, far enough so that five more seeds 30 may be discharged at the proper spacing.

Rolling of the seeds 30 is virtually eliminated by virtue of the fact that the discs 23 rotate in a plane perpendicular to the line of movement of the planter. This insures against there being any longitudinal force component which would tend to move the seeds 30 along the furrow. This arrangement also allows the use of multiple seeder discs 23 which is extremely advantageous in that it reduces the number of times the ratchet stepping mechanism must be actuated for a given length of travel. This is an especially important factor when seeds are to be planted relatively close together since the mechanism would otherwise have to be actuated at a relatively rapid rate which could result in excessive wear. It will be obvious that the frequency of actuation can be controlled by several means including the cam plate 38 and the number of teeth on the ratchet wheel 32 and the discs 23.

Bolted to lugs 44 fastened to the rear of the housing 17 are a second pair of frame members 45 which extend rearwardly to support furrow closing means. The furrow closing means includes a bifurcated scraper blade 46 pivotally suspended at 47 immediately behind the housing 17. As can be appreciated from FIGS. 1 and 2, the scraper 46 moves along the ground with its converging blades on either side of the furrow formed by the ridge 10. These blades scrape up dirt and move it into the furrow in approximately equal volume from either side in a direction generally transverse to the line of furrow. This entry of dirt from either side in approximately equal amounts minimizes displacement of the deposited seeds 30 and tends to hold them in their deposited positions.

Following the scraper 46 is a furrow tamping wheel 48 which turns on a shaft 49 mounted between the frame members 45. The drum-like wheel 48 has on its surface and along its center line a concave tamping groove 50 which passes along the furrow and tamps down the dirt gathered into the furrow by the scraper 46. The wheel 48 exerts a direct vertical force to prevent lateral displacement of the seeds 30 in the furrow.

A scraper means is provided to clean the wheel 48 and comprises a first scraper 51 conforming to the groove 50 and a second scraper 52 conforming to the configuration of the remaining surface of the wheel 48, both pivotally mounted on a bar 53 behind the wheel 48. Tension springs 54 and 55 serve to hold the scrapers 51 and 52 against the wheel.

To summarize, the particular embodiment of the invention shown herein includes a furrowing means, the wheel 1, adapted to press or mold a smooth sided furrow. A seed dispenser follows the furrowing means and includes the discs 23 which are arranged to drop groups of five seeds 30 into the furrow in extremely accurate manner and without substantial twisting, rolling or bouncing. The stop-and-start motion afforded by the ratchet or stepping mechanism insures that the seeds 30 are in fact dropped from the discs 23 at the proper time. Following the seed dispenser there is a furrow closing means, the scraper 46 and wheel 48, which covers the seeds 30 and closes the furrow in such a manner as to avoid any displacement of the seeds 30. While a particular, preferred embodiment of the invention has been shown and described herein, however, it should be apparent that variations in the particular structure shown herein may be made without departure from the invention. The invention is not, therefore, intended to be limited except insofar as such limitations appear in the following claims.

We claim:

1. In a seed planter having a horizontal line of movement, a seed dispenser comprising: a hollow cylindrical housing having a shaft along its axis that is parallel to the line of movement of the planter, said housing having a supply opening and a plurality of downwardly opening discharge ports therethrough that open directly to the ground beneath the planter; a plurality of seeder discs mounted on the shaft to rotate therewith in parallel vertical planes transverse to the line of movement of the planter, each disc having seed notches about its periphery that pass by the supply opening and over a corresponding discharge port; and a stepping mechanism to rotate the discs in incremental steps in response to horizontal movement of the planter, the notches of the discs being aligned so that as the discs rotate a selected number of successive incremental steps successive notches on all of the discs are moved simultaneously to discharge positions over their corresponding discharge ports.

2. In a seed planter, the combination comprising: a relatively heavy furrowing wheel adapted to roll along the ground along a horizontal line of movement and having an outwardly extending ridge about its circumference that is adapted to be pressed into the ground to form a furrow and relatively wide, smooth flanges on both sides of the ridge; a seed dispenser connected to and movable with and behind the furrowing wheel, said dispenser including a housing having a supply opening and a plurality of downwardly opening discharge ports therethrough that open directly to the ground beneath the planter, said ports being aligned with the ridge to be over the furrow, and a plurality of seeder discs mounted in the housing to be rotatable in parallel vertical planes transverse to the line of movement of the furrowing wheel, each said disc having seed notches about its periphery which pass by the supply opening and over a corresponding port, the notches of the discs being equal in number and aligned for simultaneous operation; a ratchet mechanism for rotating the discs, said mechanism including a cam means rotatable with the furrowing wheel, a cam following linkage including a pawl means and a toothed ratchet wheel rotatable in incremental steps in response to the pawl means and adapted to cause the discs to be rotated, said ratchet mechanism causing, for successive incremental steps of rotation of the ratchet wheel, successive notches of the discs to be moved simultaneously into discharge positions over corresponding discharge ports; a bifurcated scraper mounted to follow the dispenser, said scraper having converging blades adapted to move soil into the furrow from both sides thereof in approximately equal volume and in a direction generally transverse to the run of the furrow; and a tamping wheel mounted to follow the scraper and adapted to tamp down with a substantially vertical force soil moved into the furrow by the scraper.

3. In a seed planter having a horizontal line of movement, a seed dispenser comprising: a hollow cylindrical housing having a shaft along its axis that is parallel to the line of movement of the planter, said housing having a supply opening and a plurality of downwardly opening discharge ports therethrough that open directly to the ground beneath the planter; a plurality of seeder discs mounted on the shaft to rotate therewith in parallel vertical planes transverse to the line of movement of the planter, each disc having seed notches about its periphery that pass by the supply opening and over a corresponding discharge port; and means to rotate the discs in response to horizontal movement of the planter, the notches of the discs being aligned so that successive notches of all of the discs are moved simultaneously to discharge portions over their corresponding discharge ports.

4. In a seed dispenser for a seed planter having a horizontal line of movement, the combinaiton comprising: a hollow cylindrical housing having a shaft along its axis that is parallel to the line of movement of the planter, said housing having a supply opening and a plurality of downwardly opening discharge ports therethrough that are adapted to open directly to the ground beneath the planter; a plurality of seeder discs mounted on the shaft to rotate therewith in parallel vertical planes transverse to the line of movement of the planter, each of said discs having seed notches about its periphery each of which notches comprises a generally radial floor and an overhanging roof portion leading from the innermost end of the floor toward the periphery of the disc, said supply opening and discharge ports all being located on the side of the vertical centerline of the discs on which the notches are moving upwardly as the discs are rotated, the ports being below the supply opening so that seeds picked up by the notches at the supply opening will be carried therein about the major portion of the circumference of the disc and past the base of the vertical centerline to the discharge ports, the floors of the notches being disposed at such angles that they are substantially vertical as the discs pass over the discharge ports; and means to rotate the discs in response to horizontal movement of the planter, the notches of the disc being aligned so that successive notches of all of the discs are moved simultaneously to discharge positions over their corresponding discharge ports.

References Cited by the Examiner

UNITED STATES PATENTS

| | | | |
|---|---|---|---|
| 355,948 | 1/1887 | Parker | 111—77 |
| 669,600 | 3/1901 | Skinner | 111—77 |
| 930,831 | 8/1909 | Brinkoeter | 111—77 |
| 1,168,859 | 1/1916 | Compton. | |
| 1,669,331 | 5/1928 | Fullilove | 111—51 |
| 2,645,385 | 7/1953 | Wechsler | 222—274 |

FOREIGN PATENTS 821,862   11/1951   Germany.

ABRAHAM G. STONE, *Primary Examiner.*

WILLIAM A. SMITH III, *Examiner.*